(12) United States Patent
Kim et al.

(10) Patent No.: US 11,559,908 B2
(45) Date of Patent: Jan. 24, 2023

(54) ROBOT UNIT

(71) Applicants: Hyundai Motor Company, Seoul (KR); Kia Motors Corporation, Seoul (KR)

(72) Inventors: Beom Su Kim, Gyeonggi-do (KR); Sang In Park, Gyeonggi-do (KR); Seung Kyu Nam, Seoul (KR); Dong Jin Hyun, Gyeonggi-do (KR); Ju Young Yoon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 124 days.

(21) Appl. No.: 17/081,143

(22) Filed: Oct. 27, 2020

(65) Prior Publication Data

US 2021/0394374 A1     Dec. 23, 2021

(30) Foreign Application Priority Data

Jun. 17, 2020    (KR) ........................ 10-2020-0073944

(51) Int. Cl.
| | |
|---|---|
| *B25J 9/10* | (2006.01) |
| *B25J 19/00* | (2006.01) |
| *B25J 9/00* | (2006.01) |
| *B25J 9/04* | (2006.01) |

(52) U.S. Cl.
CPC ......... *B25J 19/0025* (2013.01); *B25J 9/0006* (2013.01); *B25J 9/046* (2013.01)

(58) Field of Classification Search
CPC ... B25J 9/104; B25J 9/046; B25J 9/106; B25J 9/0006
See application file for complete search history.

(56) References Cited

FOREIGN PATENT DOCUMENTS

| | | | |
|---|---|---|---|
| CN | 110666832 A | * | 1/2020 |
| NL | 2016507 B1 | * | 10/2017 |

* cited by examiner

*Primary Examiner* — Randell J Krug
(74) *Attorney, Agent, or Firm* — Fox Rothschild LLP

(57) ABSTRACT

A robot uni includes: a first link forming a center of rotation of the robot unit; a second link configured to perform a revolution motion or a rotation motion based on the center of rotation when rotated about the first link; first members, each of which is provided between the first link and the second link; drivers, each of which is provided in a direction that faces the first link and is configured to provide driving forces to the first members; wires configured to transmit the driving forces of the drivers to the first members; and second members, each of which is provided on the first link and the second link, is wound by the wires, and is configured to perform a revolution motion or a rotation motion along with the first link and the second link in a case where each of the first members is driven.

12 Claims, 6 Drawing Sheets

300: 310, 320, 330, 340

600: 610, 620, 630, 640

ROBOT UNIT

CROSS REFERENCE TO RELATED APPLICATION

The present application claims under 35 U.S.C. § 119(a) the benefit of Korean Patent Application No. 10-2020-0073944, filed Jun. 17, 2020, the entire contents of which are incorporated by reference herein.

BACKGROUND

1. Technical Field

The present disclosure relates to a robot unit in which drivers providing driving forces to first members are spaced apart from the first members and are housed in a base, the drivers and the first members are connected by wires, and the wires connected to the first members that are not driven in the case where the driving forces are transmitted by the wires are not influenced.

2. Description of the Related Art

A robot can incorporate motions that mimic a human body to handle various tasks, or in the case of a wearable robot, enable a person to help move by wearing it. In particular, robot driving devices are designed to naturally implement joint motions to be analogous to the motions of the human body.

Conventional robot driving devices are made up of drivers, where each driver is coupled to a motor and a decelerator, and serial joints. The drivers that provide driving forces to first members are located adjacent to the first members so as to promptly transmit the driving forces to the first members and facilitate control of the driving forces.

However, the conventional robot driving devices have a problem in that the driver is located above and adjacent to the first member, and thus a volume of the robot driving device is increased compared to a restricted size of the human body. There is a problem in that, because the driver is provided at each joint position, a person has difficulty in wearing the robot driving device, resulting in possible inconvenience, and another problem is that a consumption of power supplied by a battery is increased.

If the volume of the robot driving device is increased, then the robot driving device does not easily coincide with a center of motion of the human body. There is a limitation that a motion speed of the robot driving device is restricted due to heavy device weight. Further, it may be difficult to manufacture the robot driving device due to a complicated structure, resulting in a problem of increased manufacturing costs. Further, in conventional robot driving devices, different wires that perform functions irrelevant to the joint motions may interfere with one or more of the first members, and thus equipment may be deteriorated or damaged. Simultaneously, there is a problem in that, in the case where the plurality of first members are driven, the first members interfere with each other and the intended joint motions are not implemented. In this way, the conventional robot driving devices have limitations to wearability and motion reproducibility of the human body.

SUMMARY

The present disclosure provides a robot unit in which a driver providing a driving force to a first member is disposed apart from the first member, a link of a robot and a second member simultaneously perform a revolution motion or a rotation motion based on the centers of rotation thereof, thereby wires irrelevant to joint motions do not interfere with wires other than the wires.

To achieve the object, a robot unit according to the present disclosure includes: a first link forming a center of rotation of the robot unit; a second link configured to perform a revolution motion or a rotation motion based on the center of rotation when rotated about the first link; first members, each of which is provided between the first link and the second link; drivers, each of which is provided in a direction that faces the first link and is configured to provide driving forces to the first members; wires configured to transmit the driving forces of the drivers to the first members; and second members, each of which is provided on the first link and the second link, is wound by the wires, and is configured to perform a revolution motion or a rotation motion along with the first link and the second link in a case where each of the first members is driven.

Each of the second members may include: a first sheave which is provided at one end of the first link and around which the wire is wound; and a second sheave which is provided at one end of the second link, around which the wire passing through the first sheave is wound, and which performs a revolution motion or a rotation motion based on the center of rotation thereof along with the second link when rotated about the first link, whereby lengths of the wires are maintained.

Further, each of the first members may be connected to the driver corresponding thereto by the wires, and the wires may be wound around and connected to the first and second sheaves between the driver and the first member.

The wires connected to the first member to be operated may be rotated about the first sheave along with the second sheave, and the lengths thereof may be maintained, thereby preventing interference with driving of a point between the driver and the first member.

The robot unit may include a base in which the plurality of drivers are housed, and each of the drivers may be connected to each of the first members by the wires and may provide the driving force to the corresponding first member, and the base may be configured to be located at a shoulder point of a wearer.

Each of the second members may be formed in multiple layers in which the plurality of wires are layered, and the plurality of wires may be caught in each of the second members.

The wires wound around the layers of the first and second sheaves may be connected to the first members different from each other.

Each of the wires may be formed in a loop shape in which a first end thereof is connected to the driver and a second end thereof extends to vertically pass through the second link and is wound around the first member, and may be connected to wind a first and a second end of the first member.

The first member may be provided at a contact point between the first link and the second link, and be rotated about the first link.

The first members may be made up of shoulder first members, an elbow first member, and a wrist first member for a wearer, and be independently driven.

Further, a sun gear may be disposed on one side of the first link, a planetary gear engaged with the sun gear may be disposed on one side of the second link, and the second link may perform a revolution motion or a rotation motion around the first link due to an engagement relationship between the sun gear and planetary gear.

The robot unit according to the present disclosure is configured such that drivers are housed in a base and need to be mounted adjacent to first members, and thus a volume and weight of a robot driving device are reduced, and has an effect of facilitating wearability of a person.

Further, a second link performs a revolution motion or a rotation motion around a first link, and thereby lengths of wires are not changed and are not influenced by a link or a second member irrelevant to the joint motions in the case where the joint motions are implemented. Thereby, there is an effect capable of accurately implementing intended joint motions.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
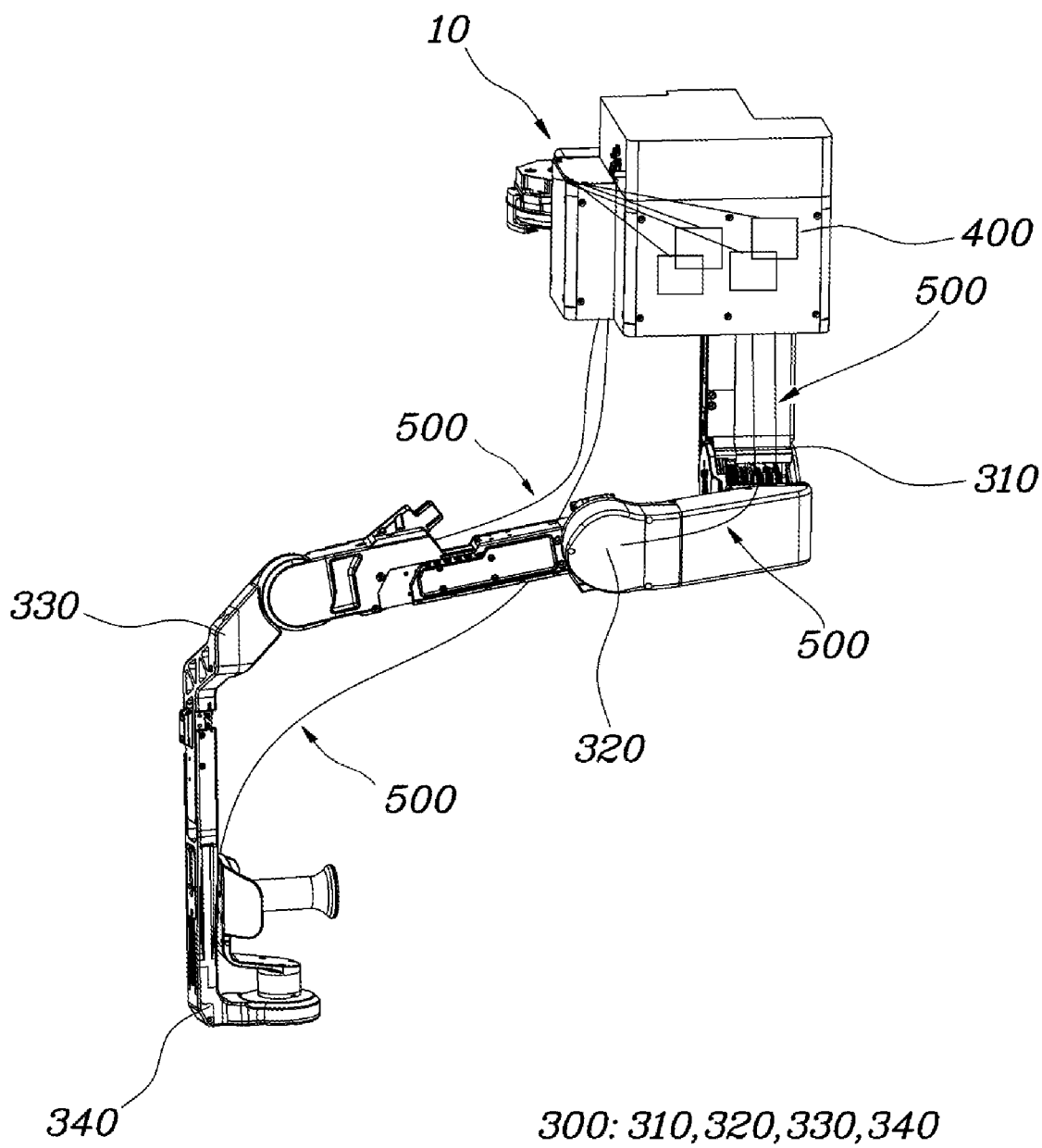
FIG. 1 is a perspective view illustrating a robot unit according to an embodiment of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to other component, it should be understood that there is no component therebetween. The other expressions of describing a relation between structural elements, i.e. "between" and "merely between" or "neighboring" and "directly neighboring", should be interpreted similarly to the above description.

Hereinafter, a preferred embodiment of the present disclosure will be described in detail with reference to the accompanying drawings. Similar reference numerals presented in the drawings designate similar elements.

Unlike the related art, a robot unit 10 according to the present disclosure is configured such that first members 300 of a robot are spaced apart from a driver 400 of the robot. The robot unit 10 can implement an accurate motion because a wire 500 transmitting a driving force is caught in each of the first members 300, and does not interfere with another wire 500 in the case where one of the first members 300 is moved.

Figure 2:
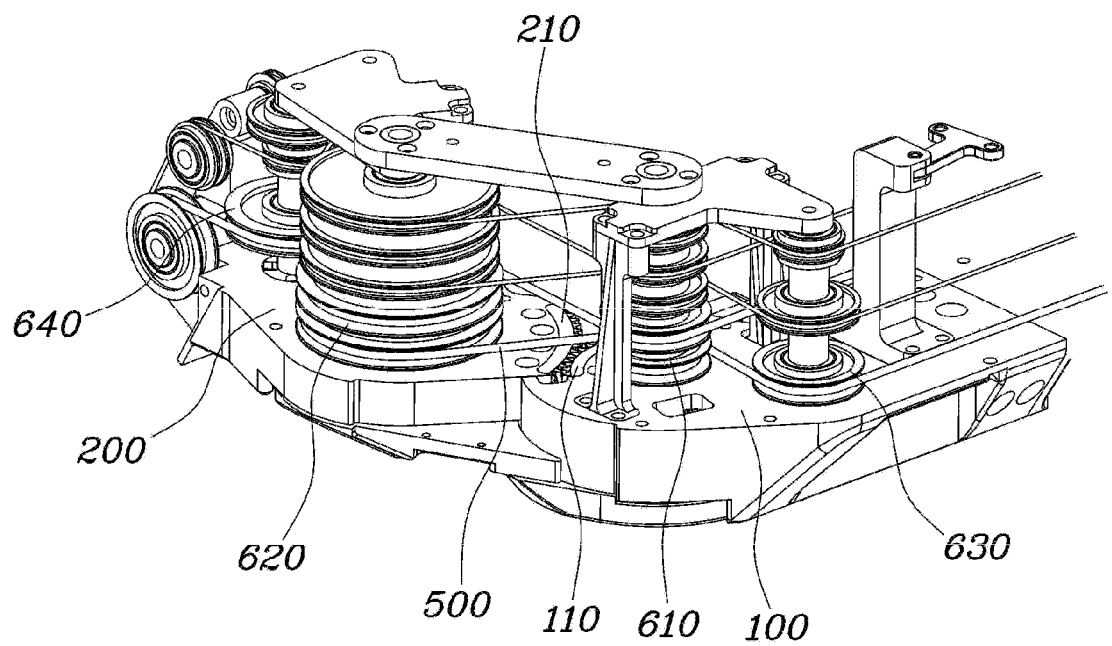
FIG. 2 illustrates a first link and a second link of the robot unit according to the embodiment of the present disclosure.

FIG. 1 is a perspective view illustrating a robot unit according to an embodiment of the present disclosure, and FIG. 2 illustrates a first link 100 and a second link 200 of the robot unit according to the embodiment of the present disclosure.

Referring to FIGS. 1 and 2, the robot unit 10 according to an embodiment of the present disclosure may include the first link 100, the second link 200, a driver 400, first members 300, wires 500, and second members 600.

The first link 100 and the second link 200 are members that are driven in engagement with each other and thereby implement joint motion of a robot. A sun gear 110 may be provided at one end of the first link 100. The sun gear 110 is fixed, and a planetary gear 210 engaged with the sun gear 110 can be rotated. Thus, one end of the first link 100 may form a center of rotation by the sun gear 110.

The second link 200 may have the planetary gear 210 formed at one end thereof. The planetary gear 210 may be configured to be engaged with the sun gear 110 and to be rotated along with the sun gear 110. The second link 200 may be rotated about the center of rotation by an engagement relationship of the sun gear 110 and the planetary gear 210. The second link 200 is rotated about the center of rotation relative to the first link 100, which is defined as a revolution motion.

An angle formed by the second link 200 and the first link 100 is changed while the second link 200 is rotated of itself by the planetary gear 210 simultaneously with the revolution. This rotation is defined as a rotation motion.

That is, the second link 200 simultaneously performs the revolution motion and the rotation motion based on the center of rotation. The first link 100 acts as the center of rotation of the second link 200 while the second link 200 performs the revolution motion and the rotation motion.

The first link 100 and the second link 200 illustrated in FIG. 2 are relative, and may be changed according to an order in which the robot unit 10 is configured. For example, the second link 200 may function as the first link 100 in the case where any joint motion is implemented, and the first link 100 may function as the second link 200 in the case where a joint motion other than the joint motion is implemented.

The first members 300 are components by which joint motions of the robot are implemented. The first member 300 may be provided at a contact point between the first link 100 and the second link 200, or an end of the second link 200. Referring to FIG. 1, the first members 300 may be made up of shoulder first members 310 and 320, an elbow first member 330, and a wrist first member 340 for of a wearer. In FIG. 1, the shoulder first members 310 and 320 and the elbow first member 330 are formed at contact points of links, and the wrist first member 340 is formed at an end of the link.

The driver 400 is a component that supplies a driving force to the first members 300. The driver 400 may be a power-driven device such as a motor. The driver 400 may be provided in a direction that faces an end of the first link 100. The driver 400 may supply a driving force in correspondence to one of the first members 300. Because the driver 400 that supplies a driving force to each of the first members 300 in the present disclosure is located in the direction that faces the end of the first link 100, distances spaced apart from corresponding joints are different.

The wires 500 may function to transmit the driving force of the driver 400 to the first member 300. The wires 500 may be wound around the driver 400 and the first member 300, and transmit the driving force. As a spaced distance between the driver 400 and the first member 300 becomes more distant, lengths of the wires 500 become longer. Thus, the wires 500 pass through the first members 300 other than the corresponding first member 300, and it is characterized that the robot unit 10 according to the present disclosure is not influenced by motions of the first members 300 other than a motion of the corresponding first member 300.

The second members 600 may be provided on paths along which the wires 500 go, be wound by the wires 500, and function to switch directions of the wires 500 or to transmit a driving force. The second member 600 is provided on the first link 100 and the second link 200. In the case where the first member 300 is driven, the second member 600 performs a revolution motion or a rotation motion along with the first member 300. Because the second member 600 simultaneously performs the revolution motion and the rotation motion and thereby a length of the wound wire 500 is not changed, the second member 600 may be subjected to non-interference (motion decoupling) that is not influenced by the first members 300 other than the driven first member 300.

Referring to FIG. 2, the second member 600 may include a first sheave 610 and a second sheave 620. The first sheave 610 may be provided at one end of the first link 100, and be wound by the wire 500. The second sheave 620 may be provided at one end of the second link 200, and be wound by the wire 500 passing through the first sheave 610. In the case where the second link 200 is rotated about the first link 100, the second sheave 620 may perform a revolution motion or a rotation motion based on the center of rotation along with the second link 200. The length of the wire 500 wound around the second member 600 may be constantly maintained by the revolution motion or the rotation motion of the second sheave 620.

Two or more second members 600 may be provided. As illustrated in FIG. 2, the first sheave 610 and the second sheave 620 may be provided at the contact point between the first link 100 and the second link 200. The second member 600 may further include a third sheave 630 on the first link 100 and a fourth sheave 640 on the second link 200. Because the sheaves may be provided on the path along which the wire 500 goes and be wound by the wire 500, various numbers may be provided according to a size of the robot.

Further, the first sheave 610 and the second sheave 620 may be formed in multiple layers in which the plurality of wires 500 are layered. Because the wires 500 are wound around each of the first members 300, the wires 500 are wound around the first member 300 from the driver 400 through the second member 600. Thus, because the wires 500 pass through the second member 600 located between the driver 400 and the first member 300, the second member 600 is formed in multiple layers such that the wires 500 different from each other do not interfere, and the wires 500 are wound around the layers different from each other. That is, the wires 500 wound around the respective layers of the first sheave 610 and the second sheave 620 are connected to the first members 300 different from each other, and transmit a driving force.

Figure 3:
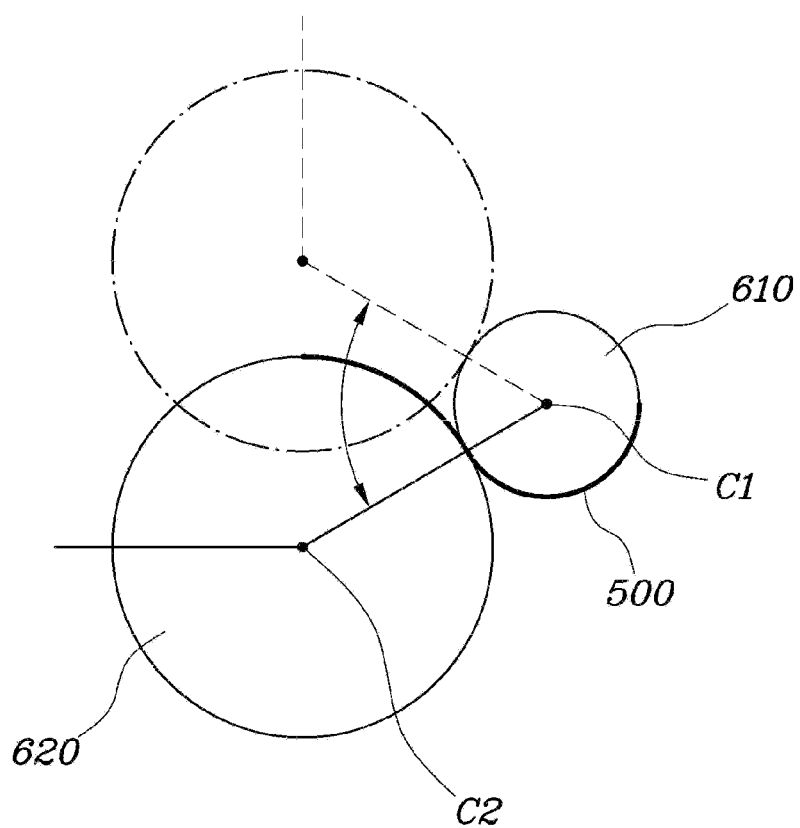
FIGS. 3 and 4 are views simply illustrating the centers of rotation about which the first link and the second link of the robot unit according to the embodiment of the present disclosure are driven.
Figure 4:
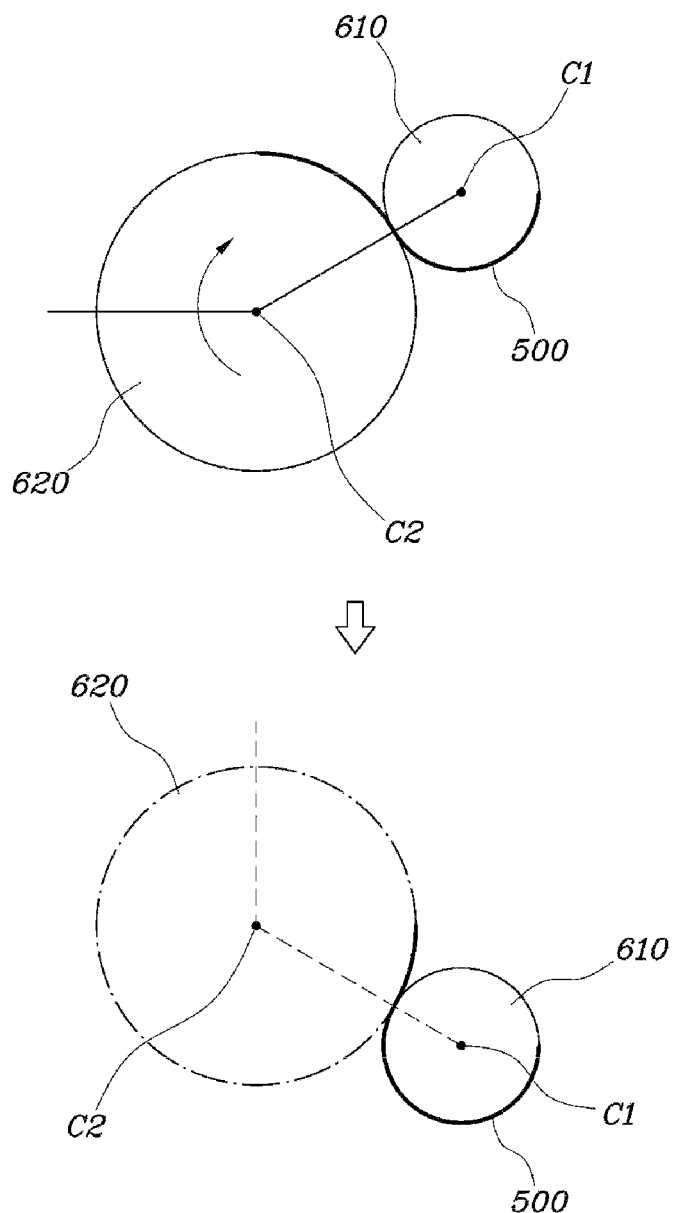

FIGS. 3 and 4 are views simply illustrating the centers of rotation about which the first link 100 and the second link 200 of the robot unit according to the embodiment of the present disclosure are driven.

Referring to FIGS. 3 and 4, in the case where the robot unit 10 according to the embodiment of the present disclosure implements a joint motion, the center C1 of the first sheave 610 is fixed to become the center of rotation, and the center C2 of the second sheave 620 is rotated about the center C1 of the first sheave 610. That is, the second sheave 620 performs a revolution motion. Further, because the planetary gear 210 of the second link 200 is moved in engaged with the sun gear 110 of the first link 100, the second sheave 620 performs a rotation motion. The rotation motion of the second sheave 620 is generated by an engagement relationship between the sun gear 110 and the planetary gear 210.

As illustrated in FIGS. 3 and 4, in the case where the second member 600 is rotated, the wires 500 may move along the second member 600 while the lengths of the wires 500 are maintained with no change, and thus the wires 500 passing through the links are not influenced. That is, the wires 500 connected to the first member 300 to be operated are rotated about the first sheave 610 along with the second sheave 620, and the lengths thereof are maintained. Thereby, the wires 500 do not interfere with driving of a point between the driver 400 and the first member 300.

Figure 5:
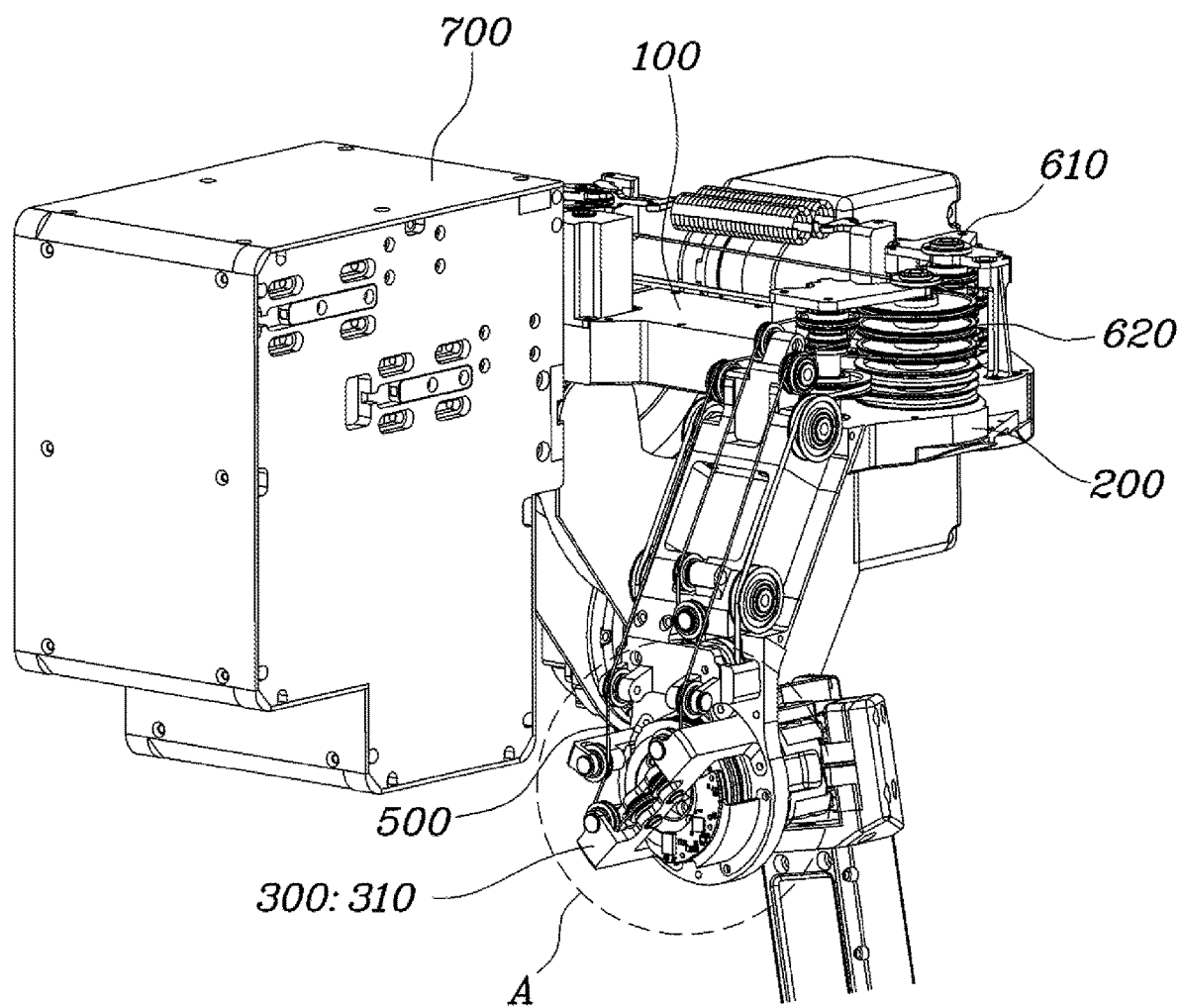
FIG. 5 is an enlarged view illustrating a driver and a first member of the robot unit according to the embodiment of the present disclosure.

FIG. 5 is an enlarged view illustrating the driver 400 and the first member 300 of the robot unit according to the embodiment of the present disclosure.

Referring to FIG. 5, the robot unit according to the embodiment of the present disclosure may further include a base 700. The base 700 is a cover in which a plurality of drivers 400 are housed. Unlike the case of a general robot unit, the drivers 400 and the first member 300 are provided apart from each other, and all the drivers 400 are configured to be housed in the base 700. The drivers 400 housed in the base 700 may be connected to the respectively corresponding first members 300 by the wires 500, and driving forces may be provided to the corresponding first members 300. The wires 500 may be wound around and connected to the first sheave 610 and the second sheave 620 between the driver 400 and the first member 300.

The base 700 may be located at a shoulder point of a wearer. The drivers 400 providing the driving forces to the first members 300 are housed in the base 700, and are located at the shoulder point. That is, the driver 400 is not installed adjacent to each of the first members 300, and is disposed with the base 700 and the first member 300 spaced apart from each other at a fixed interval. Because the shoulder of the wearer is highest excepting the head from the upper body of the wearer, connection to each of the first members 300 may be facilitated.

In the case where the base 700 is located at the shoulder point, the shoulder first members 310 and 320, the elbow first member 330, and the wrist first member 340 are formed from the base 700 in order.

Figure 6:
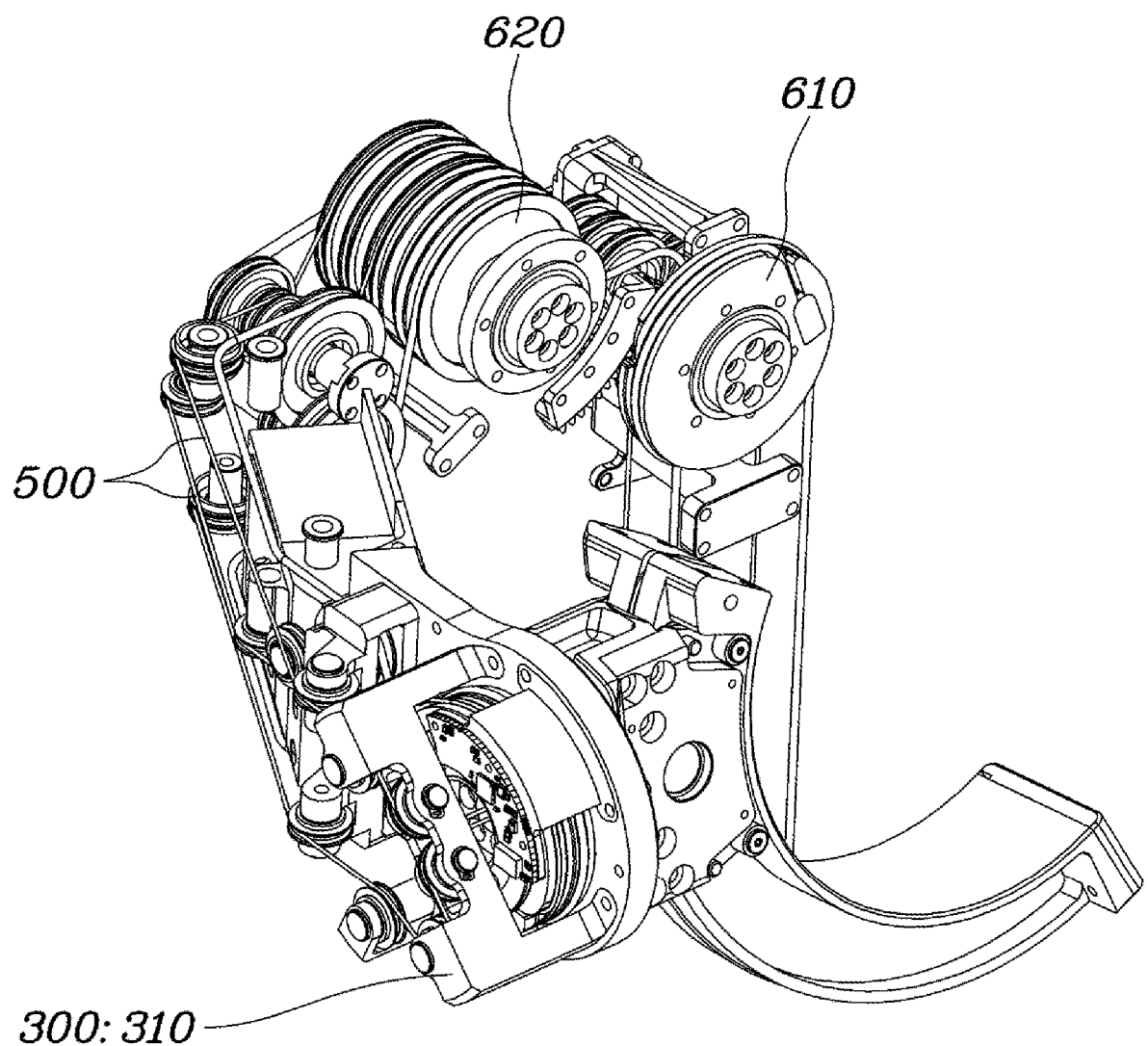
FIG. 6 is a view illustrating an area A of FIG. 5.

FIG. 6 is a view illustrating an area A of FIG. 5. FIG. 6 is a view which corresponds to the first member 300 formed at the contact point between first link 100 and the second link 200 and from which the second link 200 is omitted for understanding. The wires 500 may be formed in a loop shape in which one ends thereof may be wound around the driver 400 and first ends thereof may extend to vertically pass through the second link 200 and be wound around the first member 300. Second ends of the wires 500 may be connected to wind first and second ends (i.e., opposite ends) of the first member 300. The first member 300 provided at the contact point between the first link 100 and the second link 200 is rotated about the first link 100, and thereby a joint motion by which the second link 200 is rotated can be implemented.

If a driving force is provided from the driver 400, the second ends of the wires 500 rotate the first member 300, and thereby a joint motion can be implemented. Especially, even if another first member 300 is located on paths of the wires 500, the lengths of the wires 500 are not changed as described above, and thereby an intended joint motion can be implemented with no influence.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A robot unit comprising:
   a first link forming a center of rotation of the robot unit;
   a second link configured to perform a revolution motion or a rotation motion based on the center of rotation when rotated about the first link;
   first members, each of which is provided between the first link and the second link or on an end of the second link;
   drivers, each of which is provided in a direction that faces the first link and is configured to provide driving forces to the first members;
   wires wound around the drivers and the first members, and configured to transmit the driving forces of the drivers to the first members; and
   second members, each of which is provided on the first link and the second link, is wound by the wires, and is configured to perform a revolution motion or a rotation motion along with the first link and the second link in a case where each of the first members is driven,
   wherein each of the second members is formed in multiple layers in which the plurality of wires are configured to be layered.

2. The robot unit of claim 1, wherein each of the second members includes:
   a first sheave which is provided at one end of the first link and around which the wire is wound; and
   a second sheave which is provided at one end of the second link, around which the wire passing through the first sheave is wound, and which performs a revolution motion or a rotation motion based on the center of rotation thereof along with the second link when rotated about the first link, whereby lengths of the wires are maintained.

3. The robot unit of claim 2, wherein each of the first members is connected to the driver corresponding thereto by the wires, and the wires are wound around and connected to the first and second sheaves between the driver and the first member.

4. The robot unit of claim 3, wherein the wires connected to the first member to be operated are rotated about the first sheave along with the second sheave, and the lengths thereof are maintained, thereby preventing interference with driving of a point between the driver and the first member.

5. The robot unit of claim 1, further comprising a base in which the plurality of drivers are housed, wherein each of the drivers is connected to each of the first members by the wires, and provides the driving force to the corresponding first member.

6. The robot unit of claim 5, wherein the base is configured to be located at a shoulder point of a wearer.

7. The robot unit of claim 1, wherein the plurality of wires are caught in each of the second members.

8. The robot unit of claim 7, wherein the wires wound around the layers of the second members are connected to the first members different from each other.

9. The robot unit of claim 1, wherein each of the wires is formed in a loop shape in which a first end thereof is connected to the driver and a second end thereof extends to vertically pass through the second link and is wound around the first member, and is connected to wind a first end and a second end of the first member.

10. The robot unit of claim 9, wherein the first member is provided at a contact point between the first link and the second link, and is rotated about the first link.

11. The robot unit of claim 1, wherein the first members are made up of shoulder first members, an elbow first member, and a wrist first member for a wearer, and are independently driven.

12. The robot unit of claim 1, wherein a sun gear is disposed on one side of the first link, a planetary gear engaged with the sun gear is disposed on one side of the second link, and the second link performs a revolution motion or a rotation motion around the first link due to an engagement relationship between the sun gear and planetary gear.

* * * * *